(12) United States Patent
Buszek et al.

(10) Patent No.: US 8,396,633 B2
(45) Date of Patent: *Mar. 12, 2013

(54) AUTOMATIC AXLE DISCONNECT

(75) Inventors: John R. Buszek, Oak Park, MI (US); Brian Ginther, Rochester Hills, MI (US); Earl David Ray, White Lake, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,674

(22) Filed: Jun. 7, 2012

(65) Prior Publication Data

US 2012/0245814 A1 Sep. 27, 2012

Related U.S. Application Data

(63) Continuation of application No. 12/423,241, filed on Apr. 14, 2009, now Pat. No. 8,204,657.

(51) Int. Cl.
*G06F 7/00* (2006.01)

(52) U.S. Cl. .......... 701/51; 701/31.4

(58) Field of Classification Search .......... 701/51, 701/31.4
See application file for complete search history.

(56) References Cited

U.S. PATENT DOCUMENTS

| | | | |
|---|---|---|---|
| 5,386,898 A | 2/1995 | Weilant et al. | |
| 5,522,776 A * | 6/1996 | Alvey | 477/35 |
| 5,704,444 A | 1/1998 | Showalter | |
| 5,980,415 A | 11/1999 | Showalter | |
| 6,005,358 A * | 12/1999 | Radev | 318/139 |
| 6,105,702 A | 8/2000 | Showalter | |
| 6,347,271 B1 * | 2/2002 | Showalter | 701/69 |
| 6,631,779 B2 | 10/2003 | Watson et al. | |
| 6,729,443 B2 * | 5/2004 | Ruebusch et al. | 188/72.7 |
| 6,793,034 B2 * | 9/2004 | Raftari et al. | 180/285 |
| 7,756,621 B2 * | 7/2010 | Pillar et al. | 701/41 |
| 2005/0187059 A1 * | 8/2005 | Kroppe | 475/116 |
| 2009/0057047 A1 * | 3/2009 | Beechie et al. | 180/233 |

FOREIGN PATENT DOCUMENTS

EP 538548 A1 * 4/1993

* cited by examiner

*Primary Examiner* — Nicole Verley
(74) *Attorney, Agent, or Firm* — Fish & Richardson P.C.

(57) ABSTRACT

A method of regulating an axle disconnect device that is operable in an axle assembly of a vehicle drivetrain includes monitoring a plurality of parameters, determining whether an occurrence of at least one of a traction event and a stability event is imminent based on at least one of the parameters, the stability event being determined based on a first set parameters, and the traction event being determined based on a second set of parameters that includes less parameters than the first set of parameters, and regulating the axle disconnect device to an engaged position if the occurrence of the at least one of the traction event and the stability event is imminent.

23 Claims, 9 Drawing Sheets

AUTOMATIC AXLE DISCONNECT

CROSS-REFERENCE TO RELATED APPLICATIONS

This application is a continuation application of and claims priority to U.S. application Ser. No. 12/423,241, filed on Apr. 14, 2009, the disclosure of which is expressly incorporated herein by reference in the entirety.

FIELD

The present disclosure is generally directed to all-wheel drive vehicle systems, and more particularly to an automatic axle disconnect strategy in an all-wheel drive vehicle system.

BACKGROUND

Modern automotive vehicles provide a variety of torque transfer systems that direct drive torque to multiple wheels to propel a vehicle along a surface. Such vehicle systems can include so-called four-wheel drive (4WD) systems, and all-wheel drive (AWD) systems, in which drive torque can be simultaneously transferred to all four wheels. In such systems, the torque transfer system can be automatically, or manually switched between a two-wheel drive (2WD) mode, if available, a 4WD mode, and/or an AWD mode.

4WD and AWD systems provide significant vehicle performance and safety advantages. 4WD and AWD systems, however, can include some disadvantages, such as reduced efficiency as a result of increased drive line friction, which results in lower fuel efficiency. For example, in some 4WD and AWD systems, the non-driven wheels can back-drive torque transfer components including, but not limited to, an associated differential and prop shaft.

SUMMARY

In some embodiments, a method of regulating an axle disconnect device that is operable in an axle assembly of a vehicle drivetrain includes monitoring a plurality of parameters, determining whether an occurrence of at least one of a traction event and a stability event is imminent based on at least one of the parameters, the stability event being determined based on a first set parameters, and the traction event being determined based on a second set of parameters that includes less parameters than the first set of parameters, and regulating the axle disconnect device to an engaged position if the occurrence of the at least one of the traction event and the stability event is imminent.

In some embodiments, the method further includes determining whether the vehicle drivetrain is operating in a neutral tow condition, and regulating the axle disconnect device to a disengaged position if the vehicle drivetrain is operating in the neutral tow condition.

In some embodiments, the method further includes determining whether the vehicle drivetrain is operating in at least one of a trailer tow condition, and an incline condition based on the parameters, and regulating the axle disconnect device to the engaged position if the vehicle drivetrain is operating in at least one of the trailer tow condition, and the incline condition.

In some embodiments, the method further includes determining whether the vehicle drivetrain is operating in a highway condition based on the parameters, and regulating the axle disconnect device to a disengaged position if the vehicle drivetrain is operating in the highway condition, and if the vehicle drivetrain is not operating in another condition that requires the axle disconnect device to be in the engaged position.

In some embodiments, the method further includes determining a driver type based on the parameters, and regulating the axle disconnect device to the engaged position if the driver type is provided as an aggressive driver type.

In some embodiments, the method further includes monitoring a first set of criteria, monitoring a second set of criteria, regulating the axle disconnect device based on the first set of criteria, if the first set of criteria are met, and regulating the axle disconnect device based on the second set of criteria, if the first set of criteria are not met, and the second set of criteria are met. The first set of criteria can include a first plurality of vehicle drivetrain operating conditions, and the second set of criteria can include a second plurality of vehicle drivetrain operating conditions. The first and second pluralities of vehicle drivetrain operating conditions can include at least one vehicle drivetrain operating condition in common.

In some embodiments, the method further includes monitoring operation of at least one component of the vehicle drivetrain, determining whether a hardware fault condition is present based on the operation of the at least one component, and regulating the axle disconnect device to a disengaged position if the hardware fault condition is present.

In some embodiments, the method further includes regulating a clutch to provide drive torque to a differential, within which the axle disconnect device is located, prior to engaging the axle disconnect device.

In some embodiments, the method further includes regulating a clutch to reduce drive torque provided to a differential, within which the axle disconnect device is located, prior to disengaging the axle disconnect device.

In some embodiments, a vehicle drivetrain includes a control module that has instructions stored therein which, when executed by the control module, induces operations that include monitoring a plurality of parameters, determining whether an occurrence of at least one of a traction event and a stability event is imminent based on at least one of the parameters, the stability event being determined based on a first set parameters, and the traction event being determined based on a second set of parameters that includes less parameters than the first set of parameters, and regulating an axle disconnect device to an engaged position if the occurrence of the at least one of the traction event and the stability event is imminent.

In some embodiments, the operations further include determining whether the vehicle drivetrain is operating in a neutral tow condition, and regulating the axle disconnect device to a disengaged position if the vehicle drivetrain is operating in the neutral tow condition.

In some embodiments, the operations further include determining whether the vehicle drivetrain is operating in at least one of a trailer tow condition, and an incline condition based on the parameters, and regulating the axle disconnect device to the engaged position if the vehicle drivetrain is operating in at least one of the trailer tow condition, and the incline condition.

In some embodiments, the operations further include determining whether the vehicle drivetrain is operating in a highway condition based on the parameters, and regulating the axle disconnect device to a disengaged position if the vehicle drivetrain is operating in the highway condition, and if the vehicle drivetrain is not operating in another condition that requires the axle disconnect device to be in the engaged position.

In some embodiments, the operations further include determining a driver type based on the parameters, and regulating the axle disconnect device to the engaged position if the driver type is provided as an aggressive driver type.

In some embodiments, the operations further include monitoring a first set of criteria, monitoring a second set of criteria, regulating the axle disconnect device based on the first set of criteria, if the first set of criteria are met, and regulating the axle disconnect device based on the second set of criteria, if the first set of criteria are not met, and the second set of criteria are met. The first set of criteria can include a first plurality of vehicle drivetrain operating conditions, and the second set of criteria can include a second plurality of vehicle drivetrain operating conditions. The first and second pluralities of vehicle drivetrain operating conditions can include at least one vehicle drivetrain operating condition in common.

In some embodiments, the operations further include monitoring operation of at least one component of the vehicle drivetrain, determining whether a hardware fault condition is present based on the operation of the at least one component, and regulating the axle disconnect device to a disengaged position if the hardware fault condition is present.

In some embodiments, the operations further include regulating a clutch to provide drive torque to a differential prior to engaging the axle disconnect device.

In some embodiments, the operations further include regulating a clutch to reduce drive torque provided to a differential, within which the axle disconnect device is located, prior to disengaging the axle disconnect device.

In some embodiments, the vehicle drivetrain further includes a first axle assembly having a differential with the axle disconnect device operably disposed therein, a second axle assembly, and a clutch that regulates drive torque distribution between the first axle assembly, and the second axle assembly.

In some embodiments, a method of regulating an axle disconnect device that is operable in an axle assembly of a vehicle drivetrain includes monitoring a plurality of parameters, determining whether an occurrence of at least one of a traction event and a stability event is imminent based on at least one of the parameters, and regulating the axle disconnect device to an engaged position if the occurrence of the at least one of the traction event and the stability event is imminent. Whether the vehicle drivetrain is operating in at least one of a trailer tow condition, and an incline condition is determined based on the parameters, and the axle disconnect device is regulated to the engaged position if the vehicle drivetrain is operating in at least one of the trailer tow condition, and the incline condition. Whether the vehicle drivetrain is operating in a neutral tow condition is determined, and the axle disconnect device is regulated to a disengaged position if the vehicle drivetrain is operating in the neutral tow condition, regardless of other conditions.

In some embodiments, the method further includes determining whether the vehicle drivetrain is operating in a highway condition based on the parameters, and regulating the axle disconnect device to a disengaged position if the vehicle drivetrain is operating in the highway condition.

In some embodiments, the method further includes determining a driver type based on the parameters, and regulating the axle disconnect device to the engaged position if the driver type is provided as an aggressive driver type.

In some embodiments, the method further includes monitoring a first set of criteria, monitoring a second set of criteria, regulating the axle disconnect device based on the first set of criteria, if the first set of criteria are met, and regulating the axle disconnect device based on the second set of criteria, if the first set of criteria are not met, and the second set of criteria are met.

In some embodiments, the first set of criteria can include a first plurality of vehicle drivetrain operating conditions, and the second set of criteria can include a second plurality of vehicle drivetrain operating conditions.

In some embodiments, the method further includes monitoring operation of at least one component of the vehicle drivetrain, determining whether a hardware fault condition is present based on the operation of the at least one component, and regulating the axle disconnect device to a disengaged position if the hardware fault condition is present.

In some embodiments, the method further includes regulating a clutch to provide drive torque to a differential, within which the axle disconnect device is located, prior to engaging the axle disconnect device, and regulating the clutch to reduce drive torque provided to the differential, prior to disengaging the axle disconnect device.

The details of one or more embodiments of the present disclosure are set forth in the accompanying drawings and the description below. Other features, objects, and advantages of the invention will be apparent from the description and drawings, and from the claims. For example, embodiments of the present disclosure are not limited to the specific combinations of features described herein. More specifically, embodiments of the present disclosure can include any combination of the features described herein.

DESCRIPTION OF DRAWINGS

Like reference symbols in the various drawings indicate like elements.

DETAILED DESCRIPTION

Figure 1:
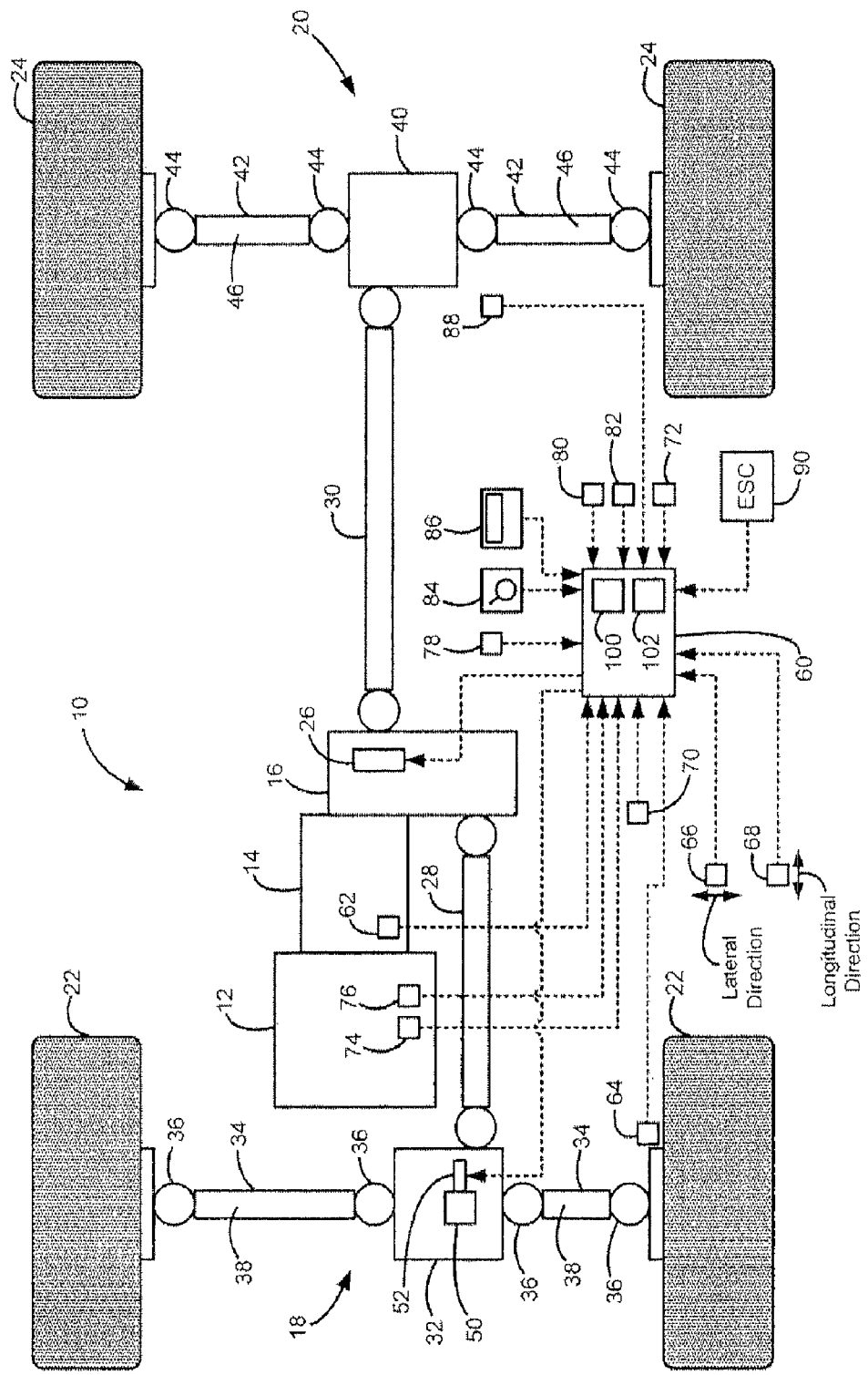
FIG. 1 is a schematic illustration of an exemplar vehicle powertrain that can be implemented in accordance with the present disclosure.

The various embodiments described herein are merely exemplary in nature, and are not intended to limit the present disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The present disclosure provides an automatic axle disconnect strategy for disconnecting a drive axle during vehicle operation. As discussed in further detail herein, the axle disconnect strategy monitors multiple vehicle operating parameters, and selectively engages or disengages an axle disconnect device (ADD) based thereon. Although an exemplar vehicle drivetrain is described herein, the axle disconnect strategy of the present disclosure can be implemented with any driven axle in any number of drivetrain configurations. Other vehicle drivetrains can include, but are not limited to, a hybrid electric drivetrain.

Referring now to FIG. 1, an exemplar vehicle drivetrain 10 is illustrated. The exemplar drivetrain 10 includes a prime mover 12, a transmission 14, a transfer case 16, a front axle assembly 18, a rear axle assembly 20, a pair of front wheels 22 and a pair of rear wheels 24. The prime mover 12 can include, but is not limited to, an internal combustion engine (ICE), and/or an electric motor, for example. The transmission 14 is driven by an output of the prime mover (e.g., a crankshaft (not shown)) and can include, but is not limited to, an automatic transmission, a manual transmission, an automated manual transmission, or a dual-clutch transmission. The transfer case 16 is driven by an output of the transmission 14, and directs drive torque to the rear axle assembly 20. The transfer case 16 selectively splits drive torque between the front and rear axle assemblies 18, 20. More specifically, the transfer case 16 includes a clutch 26 that can be regulated to correspondingly regulate the transfer of drive torque to the front and rear axle assemblies 18, 20. The transfer case 16 includes a front output that selectively drives a front propeller, or prop shaft 28, and a rear output that selectively drive a rear prop shaft 30. An exemplar drivetrain and transfer case are described in commonly assigned U.S. Pat. No. 6,631,799.

The front axle assembly 18 includes a front differential assembly 32 and a pair of driveshafts 34. The front differential assembly 32 can be driven by the front prop shaft 28, and can split drive torque between the driveshafts 34 to drive the wheels 22. The driveshafts 34 each include joints 36 and a shaft 38. The joints 36 can each include a universal-type joint (U joint) and/or a constant velocity-type joint (CVJ). The rear axle assembly 20 includes a rear differential assembly 40 and a pair of driveshafts 42. The rear differential assembly 40 can be driven by the rear prop shaft 30, and can split drive torque between the driveshafts 42 to drive the wheels 24. The driveshafts 42 each include joints 44 and a shaft 46. The joints 44 can each include a universal-type joint (U joint) and/or a constant velocity-type joint (CVJ). Although the front and rear axle assemblies 18, 20 are each illustrated as an independent suspension-type axle assembly, the present disclosure can be implemented in drivetrains including solid axle type axle assemblies.

The front differential assembly 32 includes an axle disconnect device (ADD) 50. An exemplar ADD is described in commonly assigned U.S. Pat. No. 5,386,898. The ADD 50 includes a clutch sleeve (not shown) that is movable between first and second positions using an actuator 52. In the first position, the ADD 50 is deemed to be in an engaged state, in which the clutch sleeve couples first and second axle shafts (not shown) for transmitting torque therebetween. In the engaged state, a torque transfer path is provided such that the driveshafts 34 can each be driven by torque transferred using the front prop shaft 28. In the second position, the clutch sleeve is deemed to be in a disengaged state, in which the clutch sleeve is decoupled from one of the first and second axle shafts. In the disengaged state, neither axle shaft can transmit torque to the other, and the torque transfer path between the front prop shaft 28 and the driveshafts 34 is interrupted. In this manner, drive torque cannot be transferred to the driveshafts 34 from the front prop shaft 28, and the driveshafts 34 cannot back-drive the front differential assembly 32 and/or front prop shaft 28. Consequently, increased driveline efficiency is achieved, because components of the drivetrain are not being back-driven by the non-driven wheels.

A control module 60 monitors the vehicle operating conditions based on signals from a plurality of sensors and switches, and regulates the operation of various components based thereon. For example, and as discussed in further detail herein, the ADD 50 is regulated between the engaged state and the disengaged state based on the vehicle operating conditions. Although a single control module 60 is illustrated, it is contemplated that the functionality described herein can be achieved using one or more control modules, and/or submodules of a control module.

The sensors and switches can include, but are not limited to, a transmission sensor 62, a plurality of wheel speed sensors 64, a lateral accelerometer 66, a longitudinal accelerometer 68, a yaw rate sensor 70, an ambient temperature sensor 72, an engine speed sensor 74, a throttle position sensor 76, a steering angle sensor 78, an accelerator pedal sensor 80, a brake pedal sensor 82, a driving mode switch 84, a cruise control switch 86, a trailer tow sensor 88, and an electronic stability control (ESC) switch 90. Although a single wheel speed sensor 64 is illustrated, it is appreciated that a wheel speed sensor can be associated with each of the wheels 22, 24 for determining the respective rotational speeds of each.

The transmission sensor 62 is responsive to operating conditions of the transmission 14, and can generate a signal that can be used to determine whether the transmission is in a neutral state, and/or which gear the transmission is currently operating in (e.g., first gear, second gear, third gear, reverse). Further, whether the transmission 14 is in the neutral state can be determined based on signals generated by other sensors including, but not limited to the wheel speed sensors 64 and/or the brake pedal sensor 82. Each wheel speed sensor 64 is responsive to the rotation of its respective wheel 22, 24, and a wheel speed can be determined based thereon. Further, a vehicle speed can be determined based on the signals provided by the wheel speed sensors 64, and the relative rotation of the wheels can be monitored to determine whether a wheel slip condition is present.

The lateral accelerometer 66 and the longitudinal accelerometer 68 are respectively responsive to the lateral acceleration ($\alpha_{LAT}$) and longitudinal acceleration ($\alpha_{LONG}$) of the vehicle drivetrain 10, and generate respective signals based thereon. As used herein, the term longitudinal generally refers to the vehicle driving direction, and the term lateral refers to the cross-vehicle direction. The yaw rate sensor 70 is responsive to the rotation of the vehicle about a vertical axis (i.e., an axis that is perpendicular to the longitudinal and lateral directions), and generates a signal based thereon. The ambient temperature sensor 72 is responsive to an ambient temperature ($T_{AMB}$) and generates a signal based thereon. The engine speed sensor 74 is responsive to rotation of an output of the prime mover (e.g., crankshaft), and generates a signal based thereon. An engine speed ($RPM_{ENG}$) can be determined based on the signal from the engine speed sensor 74. The steering angle sensor 78 generates a signal indicative of an angular position of the wheels 22. For example, the signal from the steering angle sensor 78 can be generated based on an angular position of a steering wheel (not shown).

In the case where the prime mover 12 includes an ICE, the throttle position sensor 76 is responsive to the degree to which a throttle of the ICE is open, and generates a signal based thereon. More specifically, the signal from the throttle position sensor 76 can indicate the rotational position of a throttle plate of the throttle (e.g., idle, one-quarter throttle, one-half throttle, three-quarters throttle, wide-open throttle). The accelerator pedal position sensor 80 is responsive to a position of an accelerator pedal (not shown), and generates a signal based thereon. In this manner, the signal generated by the accelerator pedal position sensor 80 is indicative of driver torque demand (e.g., the driver's demand for torque output from the prime mover). The brake pedal position sensor 82 is responsive to a position of a brake pedal (not shown), and generates a signal based thereon. In this manner, the signal generated by the brake pedal position sensor 82 is indicative of vehicle braking demand from a brake system (not shown).

The driving mode switch 84 can be actuated by the driver to select a particular vehicle drive mode. Exemplar drive modes can include, but are not limited to, two-wheel drive (2WD) and all-wheel drive (AWD). In the 2WD mode, only a so-called primary axle assembly is driven. In the exemplar drivetrain of FIG. 1, the rear axle assembly 20, for example, can be provided as the primary axle assembly. In the AWD mode, drive torque can be provided to both the primary axle assembly, and a so-called secondary axle assembly. In the exemplar drivetrain of FIG. 1, the front axle assembly 18, for example, can be provided as the secondary axle assembly. The driving mode switch 84 generates a signal based on the particular vehicle mode that has been selected, and the signal is provided to the control module, which regulates vehicle operation based thereon.

The trailer tow sensor 88 can be implemented within a trailer hitch assembly (not shown), and can be responsive to the presence of a trailer that is attached to the trailer hitch assembly for towing by the vehicle drivetrain. In one embodiment, the trailer tow sensor 88 can include a simple switch that generates a first signal when a trailer is attached to the trailer hitch assembly, and a second signal when a trailer is not attached to the trailer hitch assembly. In another embodiment, the trailer tow sensor 88 can include a pressure sensor that is response to a pressure applied thereto. In such an embodiment, a pressure profile can be determined based on the signal generated by the trailer tow sensor 88, and the presence/absence of a trailer can be determined based on the pressure profile. Regardless of the particular type of trailer tow sensor 88, the presence/absence of a trailer can be determined based on the signal generated therefrom.

The vehicle drivetrain 10 can operate in a cruise control mode, in which the vehicle speed is automatically regulated to stay within a predetermined threshold of a desired vehicle speed. More specifically, a driver can actuate the cruise control switch 86 to initiate the cruise control mode, and can set the desired vehicle speed. The prime mover 12, and/or other drivetrain components, can be regulated to maintain the vehicle speed at or near the desired vehicle speed.

Referring again to FIG. 1, the control module 60 can include a processor 100 and memory 102, which can include volatile and/or non-volatile memory. The control module 60 receives the various sensor and switch signals as inputs, and generates output signals. The output signals can be generated based on the input signals and/or algorithms that are pre-programmed to the memory 102. For example, the control module 60 can receive the input signals, process the input signals using one or more pre-stored algorithms, and can generate the output signals based thereon. The control module 60 can generate an output signal to regulate engagement of the clutch 26 of the transfer case 16, and can generate an output signal to regulate actuation of the ADD 50.

The control module 60 receives the signals generated by the various sensors and switches, and process the signals to regulate operation of the vehicle drivetrain 10. More specifically, the control module 60 can process the various signals to provide a so-called on-demand operation, in which the drive torque distribution between the front axle assembly 18 and the rear axle assembly 20 is automatically regulated. For example, the clutch 26 of the transfer case 16 can be automatically regulated based on the signals to regulate torque distribution between the front and rear axle assemblies 18, 20. In this manner, a traction event (e.g., relative slip between the wheels) can be detected, and the torque distribution can be regulated to resolve such a traction event. Further detail of an exemplar on-demand system is provided in above-identified U.S. Pat. No. 6,631,799.

The vehicle drivetrain 10 can also include an electronic stability control (ESC) system for improving vehicle performance, and/or vehicle safety. For example, the ESC system can anticipate and inhibit, and/or detect and resolve the occurrence of an undesired stability event including, but not limited to, understeer, oversteer, roll-over, skidding, and/or spinning. The ESC system can be selectively deactivated by the driver using the ESC switch 90.

The ESC can be executed by the control module 60, which continuously monitors vehicle dynamics including, but not limited to, steering, direction of travel, yaw rate, $\alpha_{LAT}$, $\alpha_{LONG}$, and/or individual wheel speeds. The control module 60 determines the intended vehicle direction (e.g., based on steering angle), and can compare the intended vehicle direction to an actual vehicle direction. The actual vehicle direction can be determined based on yaw rate, $\alpha_{LAT}$, $\alpha_{LONG}$, and/or individual wheel speeds. The control module 60 can also monitor other vehicle dynamics, and can determine the imminent occurrence of an undesired stability event. As used herein, the term imminent occurrence generally indicates an undesired stability event that will occur if no pre-emptive action is taken to avoid. More specifically, an imminent stability event is one that has not yet occurred, but is anticipated in view of the monitored vehicle operating parameters.

If the occurrence of an undesired stability event is detected, and/or anticipated as imminent, the control module 60 can regulate operation of components of the vehicle drivetrain 10 to correct a present stability event, and/or to inhibit the occurrence of an anticipated stability event. By way of non-limiting example, the brakes can be asymmetrically applied to the individual wheels 22, 24 in order to create torque about the vehicle's vertical axis, and to bring the actual vehicle direction back in line with the intended vehicle direction. By way of another, non-limiting example, the drive torque that is output by the prime mover 12 can be regulated to increase/reduce the drive torque provided to the wheels 22, 24. As discussed herein, embodiments of the present disclosure can proactively operate to inhibit the actual occurrence of a traction and/or stability event that is deemed to be imminent. More specifically, the ADD 50 can be selectively actuated based on the anticipated occurrence of a traction and/or stability event, prior to an actual occurrence, to proactively inhibit the actual occurrence of such an anticipated event.

Note to Inventors: Please Identify a Relevant Borgwarner Patent that Discloses an Exemplar ESC System.

As described in further detail below, the control module 60 monitors various vehicle operating parameters based on the various signals provided thereto, and executes the axle disconnect strategy of the present disclosure based thereon. More specifically, the control module 60 selectively issues actuator commands for regulating operation of the actuator 52 to engage or disengage the ADD 50. Exemplar operating parameters can include, but are not limited to, $T_{AMB}$, whether the vehicle is traveling on a slope, or incline (e.g., hill detection), whether the vehicle is in a neutral tow condition (e.g., the vehicle is being towed), whether the vehicle is towing a trailer, driver demand for an AWD mode, whether a stability event is occurring and/or is imminent, the driver's driving type (e.g., aggressive driver), whether the vehicle is undergoing highway driving or city driving, and whether an AWD control request has been issued. Each of these operating parameters will be discussed in further detail below.

$T_{AMB}$ is monitored based on a signal generated by the ambient temperature sensor 72. If $T_{AMB}$ is less than or equal to a threshold temperature ($T_{THR}$), a temperature flag ($FLAG_{TEMP}$) is set in memory 102 of the control module 60. In one exemplar embodiment, $T_{THR}$ can be equal to 0° C. (32° F., 273 K). In another exemplar embodiment, $T_{THR}$ can be greater than or equal to 0° C. (32° F., 273 K), and less than or equal to 1.5° C. (approximately 35° F., approximately 274.5 K). If $T_{AMB}$ is less than or equal to $T_{THR}$, $FLAG_{TEMP}$ can be set equal to 1, indicating a possible freezing condition. If $T_{AMB}$ is less than or equal to $T_{THR}$, $FLAG_{TEMP}$ can be set equal to 0.

The surface, on which the vehicle is traveling is monitored, to determine whether the vehicle is traveling on a sloped, or inclined surface. Whether the vehicle is traveling on an inclined surface can be determined based on a signal generated by a sensor or multiple sensors. For example, a signal generated by the longitudinal accelerometer 68 can be processed to determine whether the vehicle is traveling on an inclined surface. In other arrangements, multiple sensor signals can be processed to determine whether the vehicle is traveling on an inclined surface. In some embodiments, a degree of incline can be determined and can be compared to a threshold degree of incline. If the degree of incline is greater than or equal to the threshold degree of incline, the vehicle is deemed to be traveling on an inclined surface. If the degree of incline is less than the threshold degree of incline, the vehicle is not deemed to be traveling on an inclined surface. If the vehicle is traveling on an inclined surface a hill flag ($FLAG_{HILL}$) is set equal to 1, for example, in memory 102. If the vehicle is not traveling on an inclined surface, $FLAG_{HILL}$ is set equal to 0.

Whether the vehicle is operating in a neutral tow condition can also be monitored. A neutral tow condition can be a condition, in which the vehicle is being towed, or otherwise induced to move. In such a condition, the wheels 22, 24 of the vehicle are not being driven by the vehicle powertrain. Whether the vehicle is operating in the neutral tow condition can be determined based on various sensor signals. By way of one non-limiting example, the vehicle speed, $RPM_{ENG}$, and transmission operating state can be monitored. If the transmission 14 is operating in a neutral state (i.e., no drive torque is being transferred through the transmission), the vehicle speed is greater than a threshold vehicle speed, and $RPM_{ENG}$ is less than a threshold engine speed, the vehicle can be deemed to be operating in a neutral tow condition. If the vehicle is deemed to be operating in the neutral tow condition, a neutral tow flag ($FLAG_{NT}$) is set equal to 1, for example, in memory 102. If the vehicle is not deemed to be operating in the neutral tow condition, $FLAG_{NT}$ is set equal to 0.

Whether the vehicle is towing a trailer can also be monitored. More specifically, the signal generated by the trailer tow sensor 88 can be processed to determine whether the vehicle is towing a trailer. If the vehicle is towing a trailer, a trailer tow flag ($FLAG_{TT}$) is set equal to 1, for example, in memory 102. If the vehicle is not towing a trailer, $FLAG_{TT}$ is set equal to 0. The position of the driving mode switch is also monitored to determine the particular vehicle drive mode selected by the driver. If the driver selects the AWD mode, for example, an AWD demand flag ($FLAG_{AWDDEM}$) is set equal to 1, in memory 102. If the AWD mode is not selected, $FLAG_{AWDDEM}$ is set equal to 0.

Vehicle traction and stability events are also monitored to determine whether the vehicle is currently experiencing a traction and/or stability event, or whether the occurrence of a traction and/or stability event is imminent. If a traction and/or stability event is occurring, a stability flag ($FLAG_{STAB}$) is set equal to 1, for example, in memory 102. If a traction and/or stability event is not actually occurring, but is deemed to be imminent, $FLAG_{STAB}$ is set equal to 1. If a traction and/or stability event is not actually occurring, and is not imminent, $FLAG_{STAB}$ is set equal to 0.

The driver's driving style can also be monitored and evaluated based on various sensor signals. For example, the accelerator pedal position, and/or the ESC switch 90 can be monitored, and the driving style can be determined based thereon. By way of one non-limiting example, if the driver fully depresses the accelerator pedal, indicating a high torque demand from the prime mover 12, the driving style can be deemed to be aggressive. In one embodiment, the number of times the driver fully depresses the accelerator pedal for a give time period can be monitored, and the driving style can be deemed to be aggressive if the driver fully depresses the accelerator pedal a threshold number of times within the given time period. By way of another, non-limiting example, if the driver turns of the ESC system, the driving style can be deemed to be aggressive. If the driving style is deemed to be aggressive, an aggressive flag ($FLAG_{AGR}$) is set equal to 1, for example, in memory 102. If the driving style is not deemed to be aggressive, $FLAG_{AGR}$ is set equal to 0.

Whether the vehicle is experiencing highway or city driving can also be determined As used herein, the term highway driving refers to a driving condition, in which the vehicle is operating at more of a steady state. For example, the brake system is less often actuated, and the transmission gear, the engine speed, and the vehicle speed can each be relatively constant. For example, the engine speed remains within a specified engine speed range for a pre-defined period of time, and the vehicle speed is above a threshold vehicle speed, and remains within a specified vehicle speed range for a pre-defined period of time. The cruise control switch 86 can also be monitored to determine whether the vehicle is experiencing highway driving. For example, if the cruise control is ON and is actively regulating the vehicle speed, the vehicle can be deemed to be operating in a highway driving condition. As used herein, the term city driving refers to a driving condition, in which the vehicle is operating at more of a dynamic state. For example, the brake system is more often actuated, and the transmission gear, the engine speed, and the vehicle speed can significantly vary. For example, the vehicle is consistently accelerating or decelerating, resulting in transmission gear shifts, variance in engine speed and variance vehicle speed.

In one embodiment, if the vehicle is deemed to be operating in a highway driving condition, a highway flag ($FLAG_{HWY}$) is set equal to 1, for example, in memory 102. In such a case, the vehicle cannot be deemed to be concurrently operating in a city driving condition. Consequently, a separate city driving flag is not required, but could be implemented. If the vehicle is not deemed to be operating in a highway driving condition, $FLAG_{HWY}$ is set equal to 0. In another embodiment, if the vehicle is deemed to be operating in a city driving condition, a city flag ($FLAG_{CITY}$) is set equal to 1, for example, in memory 102. In such a case, the vehicle cannot be deemed to be concurrently operating in a highway driving condition. Consequently, a separate highway driving flag is not required, but could be implemented. If the vehicle is not deemed to be operating in a city driving condition, $FLAG_{CITY}$ is set equal to 0.

Note to Inventors: how do "AWD Control Requests" Differ from Stability Events Described Above?

The automatic axle disconnect strategy of the present disclosure provides a plurality of criteria that are evaluated based on the vehicle operating conditions including, but not limited to, those described herein. As discussed in further detail herein, each of the criteria is determined to be true, or false, and a corresponding criteria flag is set based thereon. Operation of the drivetrain 10 is transitioned between a plurality of modes based on the criteria. The modes include, but are not limited to, an economy mode and an AWD mode, which can further be classified as a sustained economy mode, a momentary economy mode, a sustained AWD mode, and a momentary AWD mode.

In the economy mode, the ADD is disengaged, or unlocked. Consequently, no torque is transferred through the ADD, effectively disconnecting the torque transfer components of the corresponding axle assembly from the remainder of the drivetrain. In this manner, the axle assembly and corresponding wheels are not driven, and cannot back-drive other drivetrain components. In the AWD mode, the ADD is in the engaged state, and an AWD flag. Consequently, torque is transferred through the ADD to effectively connect the torque transfer components of the corresponding axle assembly to the remainder of the drivetrain. In this manner, the axle and corresponding wheels can be driven.

As discussed above, each of the economy and AWD modes can be further classified as sustained or momentary. When operating in a sustained mode, an increased number of criteria must be met in order to transition out of the sustained mode, as compared to a momentary mode. Consequently, it is more difficult to transition out of a sustained mode. When operating in a momentary mode, an reduced number of criteria must be met in order to transition out of the momentary mode, as compared to a sustained mode. Consequently, it is less difficult to transition out of a sustained mode.

In embodiments of the present disclosure, the criteria can include, but are not limited to, the exemplar criteria provided in the following table (Table 1):

TABLE 1

Exemplar Criteria

| | |
|---|---|
| Criteria 1 | Sustained Economy Driving Conditions |
| Criteria 2 | Sustained AWD Driving Conditions |
| Criteria 3 | Sustained AWD Driver Demand |
| Criteria 4 | Momentary Economy Driving Conditions |
| Criteria 5 | Momentary AWD Vehicle Response |
| Criteria 6 | Momentary AWD |

Criteria 1 is true if $FLAG_{NT}$ is set (e.g., is equal to 1), and is false if $FLAG_{NT}$ is not set (e.g., is equal to 0). More specifically, criteria 1 is true if the vehicle is operating in a neutral tow condition, and is false if the vehicle is not operating in a neutral tow condition. This relationship can be provided as:

Criteria 1=TRUE, if $FLAG_{NT}=1$

If criteria 1 is true, a criteria 1 flag ($FLAG_{C1}$) is set equal to 1 in memory 102. If criteria 1 is not true, $FLAG_{C1}$ is set equal to 0.

Criteria 2 is true if $FLAG_{AMB}$ is set (e.g., is equal to 1), if $FLAG_{TT}$ is set (e.g., is equal to 1), or if $FLAG_{HILL}$ is set (e.g., is equal to 1). More specifically, criteria 2 is true if the vehicle is operating in potentially freezing temperature conditions, the vehicle is towing a trailer, or the vehicle is driving on a sufficiently severe incline. Criteria 2 is false if the vehicle is not operating in potentially freezing temperature conditions, the vehicle is not towing a trailer, and the vehicle is not driving on a sufficiently severe incline. This relationship can be provided as:

Criteria 2=FALSE, if $FLAG_{AMB}=1$, $FLAG_{TT}=1$, or $FLAG_{HILL}=1$

If criteria 2 is true, a criteria 2 flag ($FLAG_{C2}$) is set equal to 1 in memory 102. If criteria 2 is not true, $FLAG_{C2}$ is set equal to 0.

Criteria 3 is true if $FLAG_{AWDDEM}$ is set (e.g., is equal to 1). More specifically, criteria 3 is true if the driver has selected the AWD mode using the driving mode switch 84, and is false is the driver has not selected the AWD mode. This relationship can be provided as:

Criteria 3=TRUE, if $FLAG_{AWDDEM}=1$

If criteria 3 is true, a criteria 3 flag ($FLAG_{C3}$) is set equal to 1 in memory 102. If criteria 3 is not true, $FLAG_{C3}$ is set equal to 0.

In one embodiment, criteria 4 is true if $FLAG_{HWY}$ is set (e.g., is equal to 1). In another embodiment, criteria 4 is true is $FLAG_{CITY}$ is not set (e.g., is equal to 0). More generally, criteria 4 is true is the vehicle is experiencing highway driving conditions. This relationship can be provided as:

Criteria 4=TRUE, if $FLAG_{HWY}=1$ AND/OR $FLAG_{CITY}=0$

If criteria 4 is true, a criteria 4 flag ($FLAG_{C4}$) is set equal to 1 in memory 102. If criteria 4 is not true, $FLAG_{C4}$ is set equal to 0.

Criteria 5 is true if $FLAG_{STAB}$ is set (e.g., is equal to 1). More specifically, criteria 5 is true when the vehicle is currently experiencing a traction and/or stability event, or the occurrence of a traction and/or stability event is imminent. This relationship can be provided as:

Criteria 5=TRUE, if $FLAG_{STAB}=1$

If criteria 5 is true, a criteria 5 flag ($FLAG_{C5}$) is set equal to 1 in memory 102. If criteria 5 is not true, $FLAG_{C5}$ is set equal to 0.

Criteria 6 is true if $FLAG_{AGR}$ is set (e.g., is equal to 1). More specifically, criteria 6 is true when the driver is deemed to be an aggressive driver. This relationship can be provided as:

Criteria 6=TRUE, if $FLAG_{AGR}=1$

If criteria 6 is true, a criteria 6 flag ($FLAG_{C6}$) is set equal to 1 in memory 102. If criteria 6 is not true, $FLAG_{C6}$ is set equal to 0.

Figure 2:
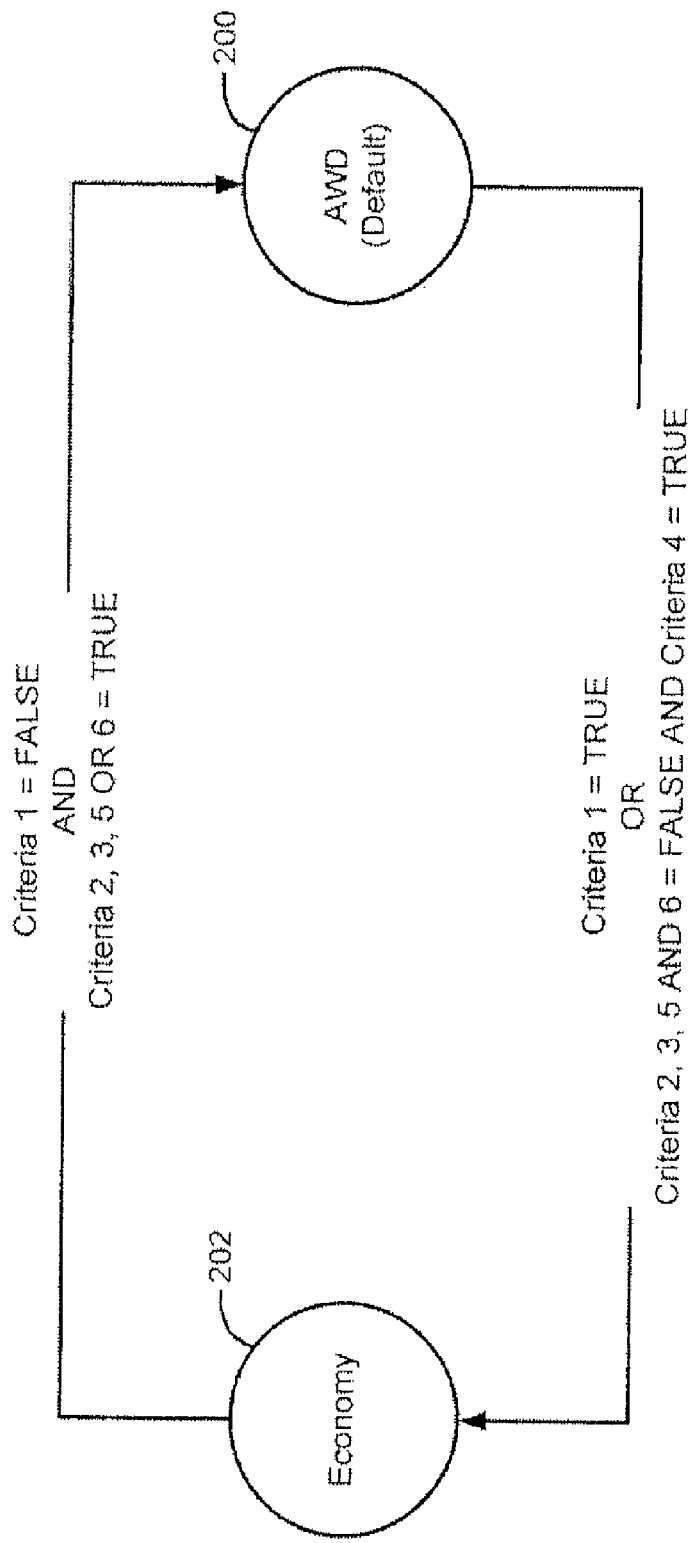
FIG. 2 is a state diagram of an axle disconnect strategy in accordance with embodiments of the present disclosure.
Figure 3:
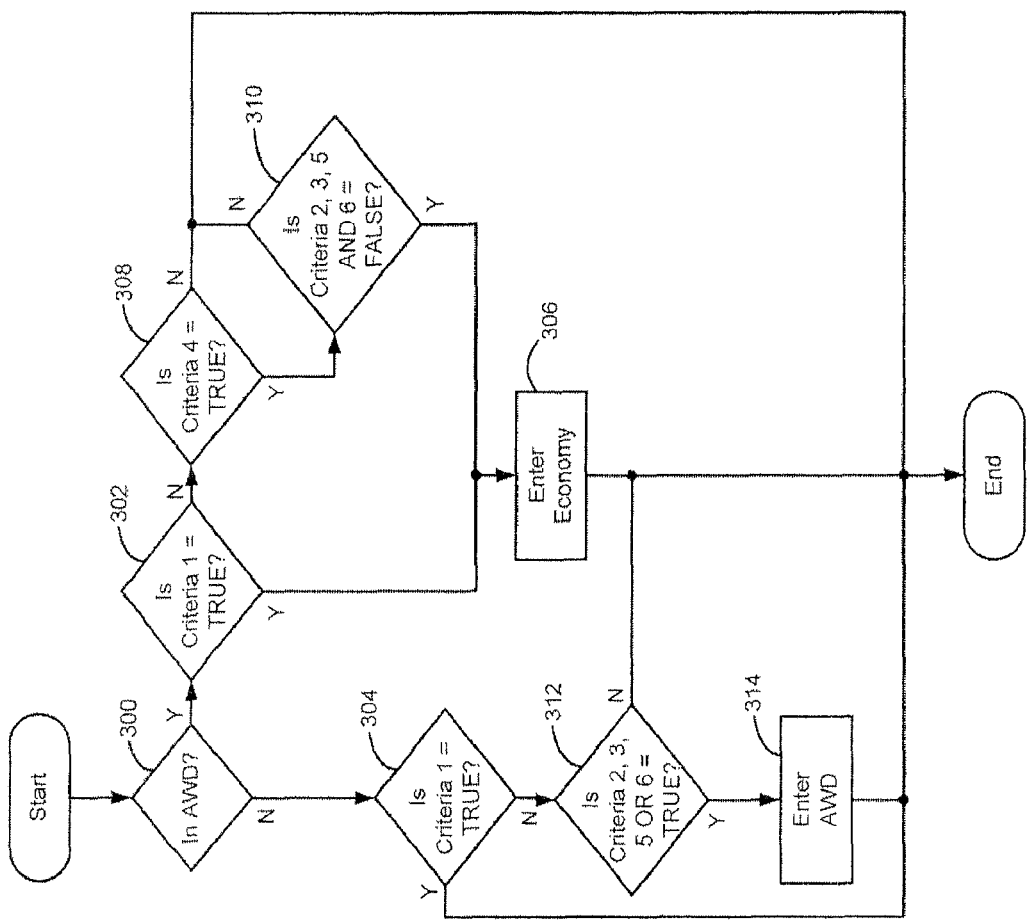
FIG. 3 is a flowchart illustrating exemplar steps for executing the axle disconnect strategy of FIG. 2.

Referring now to FIGS. 2 and 3, an embodiment of the axle disconnect strategy will be described in detail. As illustrated in FIG. 2, operation of the vehicle can transition between an AWD mode 200 and an economy mode 202. In the embodiment of FIG. 2, the AWD mode 200 is provided as a default mode. When operating in the AWD mode 200, an AWD mode flag ($FLAG_{AWD}$) is set equal to 1 and an economy mode flag ($FLAG_{ECON}$) is set equal to 0 in memory 102, the ADD is engaged, or locked, and criteria 1 through 6 are monitored. Although both $FLAG_{AWD}$ and $FALG_{ECON}$ can be provided, it is contemplated that only one need be implemented. For example, if $FLAG_{AWD}$ is set equal to 1, an AWD mode is indicated, and if $FLAG_{AWD}$ is set equal to 0, an economy mode is indicated.

In the AWD mode 200, if criteria 1 is true (i.e., the vehicle is operating in a neutral tow condition), operation of the vehicle transitions to the economy mode 202, regardless of the state of criteria 2 through 6. If criteria 2, 3, 5 and 6 are false (i.e., the vehicle is not operating in potentially freezing temperature conditions, the driver has not selected the AWD mode, the vehicle is not currently experiencing a traction and/or stability event, or the occurrence of a traction and/or stability event is not imminent, the driver is not deemed to be an aggressive driver), and criteria 4 is true (i.e., the vehicle is experiencing highway driving conditions), operation of the vehicle transitions to the economy mode 202, regardless of the state of criteria 1. When operating in the economy mode 202, $FLAG_{AWD}$ is set equal to 0, the ADD is disengaged, or unlocked, and criteria 1-3, 5 and 6 are monitored. If criteria 1 is false, and if criteria 2, 3, 5 and 6 are true, operation of the vehicle transitions to the AWD mode 200, regardless of the state of criteria 4.

The flowchart of FIG. 3 illustrates exemplar steps that can be executed to implement the axle disconnect strategy of FIG. 2. In step 300, it is determined whether the vehicle is operating in the AWD mode. If the vehicle is operating in the AWD mode, the steps continue at step 302. If the vehicle is not operating in the AWD mode, the steps continue at step 304. In step 302, it is determined whether criteria 1 is true (i.e., is $FLAG_{C1}$ set). If criteria 1 is true, the steps continue in step 306. If criteria 1 is not true, the steps continue at step 308. In step 308, it is determined whether criteria 4 is true (i.e., is $FLAG_{C4}$ set). If criteria 4 is not true the steps loop to end. If criteria 4 is true, the steps continue at step 310. In step 310, it is determined whether each of criteria 2, 3, 5 and 6 is false (i.e., are $FLAG_{C2}$, $FLAG_{C3}$, $FLAG_{C5}$ and $FLAG_{C6}$ not set). If criteria 2, 3, 5 and 6 are not false, the steps loop to end. If criteria 2, 3, 5 and 6 are false, the steps continue at step 306. In step 306, vehicle operation transitions to the economy mode, and the steps loop to end. In transitioning to the economy mode, $FLAG_{AWD}$ is set equal to 0, and a transition routine is executed, as described in further detail below.

In step 304, it is determined whether criteria 1 is true. If criteria 1 is true, the steps loop to end. If criteria 1 is not true, the steps continue at step 312. In step 312, it is determined whether any of criteria 2, 3, 5 or 6 is true. If any of criteria 2, 3, 5 or 6 is true, the steps continue at step 314. If none of criteria 2, 3, 5 and 6 is true, the steps loop to end. In step 314, vehicle operation transitions to the AWD mode, and the steps loop to end. In transitioning to the AWD mode, $FLAG_{AWD}$ is set equal to 1, and the transition routine is executed.

Figure 4:
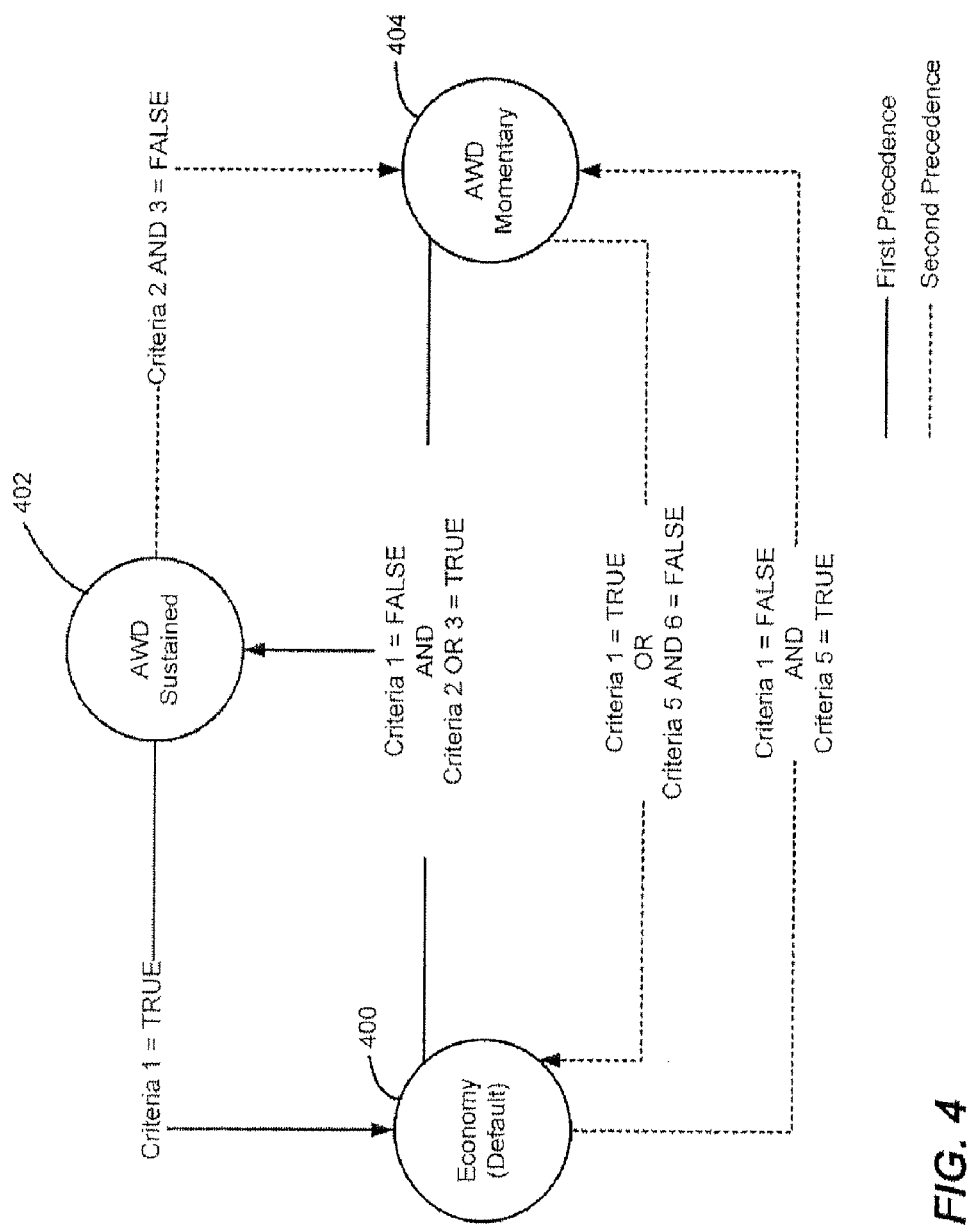
FIG. 4 is a state diagram of an axle disconnect strategy in accordance with embodiments of the present disclosure.
Figure 5:
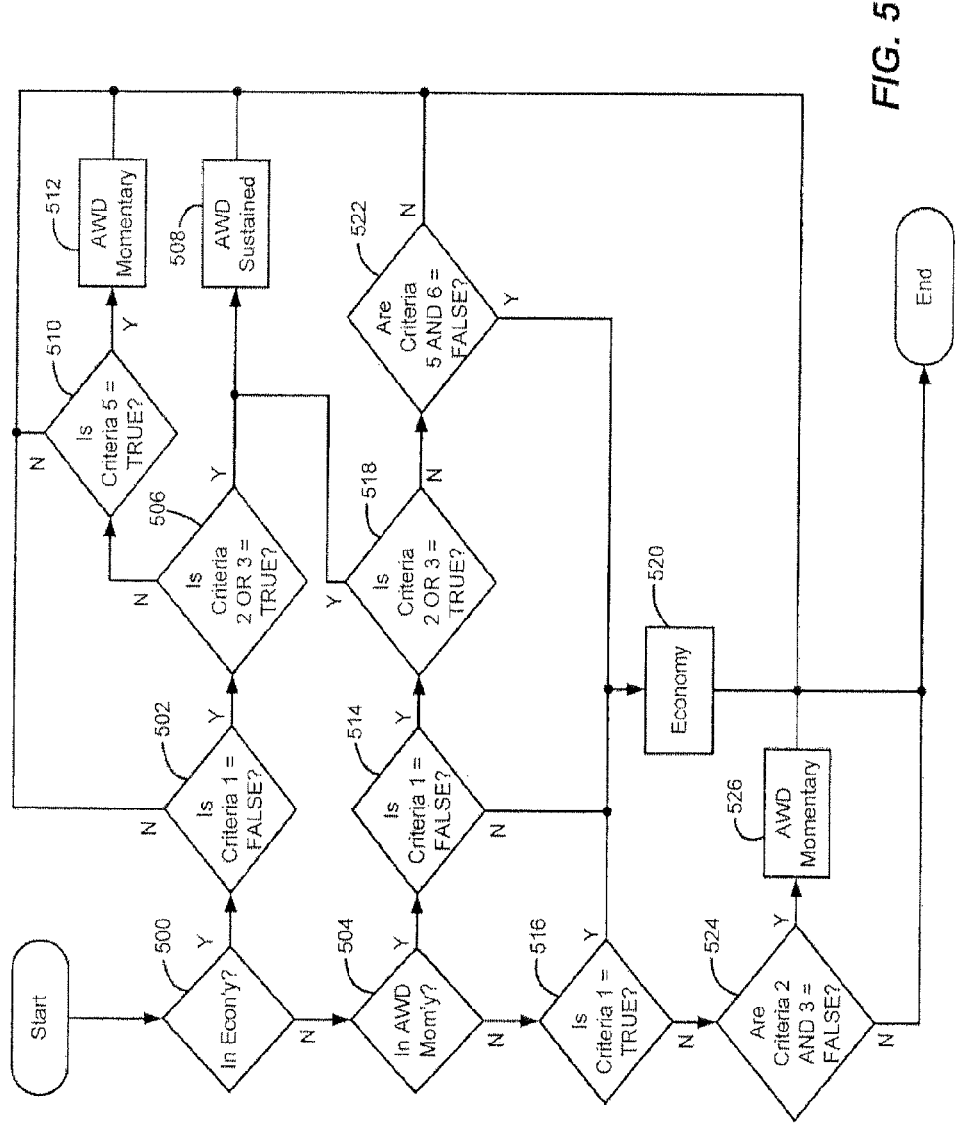
FIG. 5 is a flowchart illustrating exemplar steps for executing the axle disconnect strategy of FIG. 4.

Referring now to FIGS. 4 and 5, another embodiment of the axle disconnect strategy will be described in detail. As illustrated in FIG. 4, operation of the vehicle can transition between an economy mode 400, an AWD sustained mode 402, and an AWD momentary mode 404. In the embodiment of FIG. 4, the economy mode is provided as the default mode. When operating in the economy mode, $FLAG_{AWD}$ is set equal to 0, the ADD is disengaged, or unlocked, and criteria 1-3 and 5 are monitored. More specifically, a first criteria set and a second criteria set are monitored. The first criteria set includes criteria 1-3, and the second criteria set includes criteria 1 and 5. The first criteria set takes precedence over the second criteria set. More specifically, if all of the criteria of the first criteria set are met, and all of the criteria of the second criteria set are met, vehicle operation transitions in accordance with the first criteria set. If not all of the criteria of the first criteria set are met, but all of the criteria of the second criteria set are met, vehicle operation transitions in accordance with the second criteria set. While operating in the economy mode, if criteria 1 is false and either criteria 2 or criteria 3 is true, vehicle operation transitions to the AWD sustained mode 402. If neither criteria 2 nor criteria 3 is true, but criteria 1 is false and criteria 5 is true, vehicle operation transitions to the AWD momentary mode 404.

When operating in the AWD sustained mode 402, $FLAG_{AWD}$ is set equal to 1, the ADD is engaged, or locked, and criteria 1 and 2 are monitored. More specifically, a first criteria set and a second criteria set are monitored. The first criteria set includes criteria 1, and the second criteria set includes criteria 2. The first criteria set takes precedence over the second criteria set. If criteria 1 is true, vehicle operation transitions to the economy mode 400. If criteria 1 is false, and criteria 2 is false, vehicle operation transitions to the AWD momentary mode 404.

When operating in the AWD momentary mode 404, $FLAG_{AWD}$ is set equal to 1, the ADD is engaged, or locked, and criteria 1-3, 5 and 6 are monitored. More specifically, a first criteria set and a second criteria set are monitored. The first criteria set includes criteria 1-3, and the second criteria set includes criteria 1, 5 and 6. The first criteria set takes precedence over the second criteria set. If criteria 1 is false and either criteria 2 or criteria 3 is true, vehicle operation transitions to the AWD sustained mode 402. If criteria 1 is true, vehicle operation transitions to the economy mode 400. If criteria 1-3 are false, and criteria 5 and criteria 6 are false, vehicle operation transitions to the economy mode 400.

The flowchart of FIG. 5 illustrates exemplar steps that can be executed to implement the axle disconnect strategy of FIG. 4. In step 500, it is determined whether the vehicle is operating in the economy mode. If the vehicle is operating in the economy mode, the steps continue at step 502. If the vehicle is not operating in the economy mode, the steps continue at step 504. In step 502, it is determined whether criteria 1 is false. If criteria 1 is not false, the steps loop to end. If criteria 1 is false, the steps continue at step 506. In step 506, it is determined whether either criteria 2 or criteria 3 is true. If either criteria 2 or criteria 3 is true, the steps continue at step 508. If neither criteria 2 nor criteria 3 is true, the steps continue at step 510. In step 508, vehicle operation transitions to the AWD sustained mode, and the steps loop to end. In transitioning to the AWD sustained mode, $FLAG_{AWD}$ is set equal to 1, and the transition routine is executed. In step 510, it is determined whether criteria 5 is true. If criteria 5 is true, the steps continue at step 512. If criteria 5 is not true, the steps loop to end. In step 512, vehicle operation transitions to the AWD momentary mode. In transitioning to the AWD momentary mode, $FLAG_{AWD}$ is set equal to 1, and the transition routine is executed.

In step 504, it is determined whether the vehicle is operating in the AWD momentary mode. If the vehicle is operating in the AWD momentary mode, the steps continue at step 514. If the vehicle is not operating in the AWD momentary mode, the vehicle is operating in the AWD sustained mode, and the steps continue at step 516. In step 514, it is determined whether criteria 1 is false. If criteria 1 is false, the steps continue at step 518. If criteria 1 is not false, the steps continue at step 520. In step 518, it is determined whether criteria 2 or criteria 3 is true. If either criteria 2 or criteria 3 is true, the steps continue at step 508, described above. If neither criteria 2 nor criteria 3 is true, the steps continue at step 522. In step 522, it is determined whether both criteria 5 and criteria 6 are false. If criteria 5 and criteria 6 are both false, the steps continue at step 520. If criteria 5 and criteria 6 are not both false, the steps loop to end. In step 520, vehicle operation transitions to the economy mode, and the steps loop to end. In transitioning to the economy mode, $FLAG_{AWD}$ is set equal to 0, and the transition routine is executed.

In step 516, it is determined whether criteria 1 is true. If criteria 1 is true, the steps continue at step 520, described above. If criteria 1 is not true, the steps continue at step 524. In step 524, it is determined whether criteria 2 is false. If criteria 2 is false, the steps continue at step 526. If criteria 2 is not false, the steps loop to end. In step 526, vehicle operation transitions to the AWD momentary mode. In transitioning to the AWD momentary mode, $FLAG_{AWD}$ is set equal to 1, and the transition routine is executed.

Figure 6:
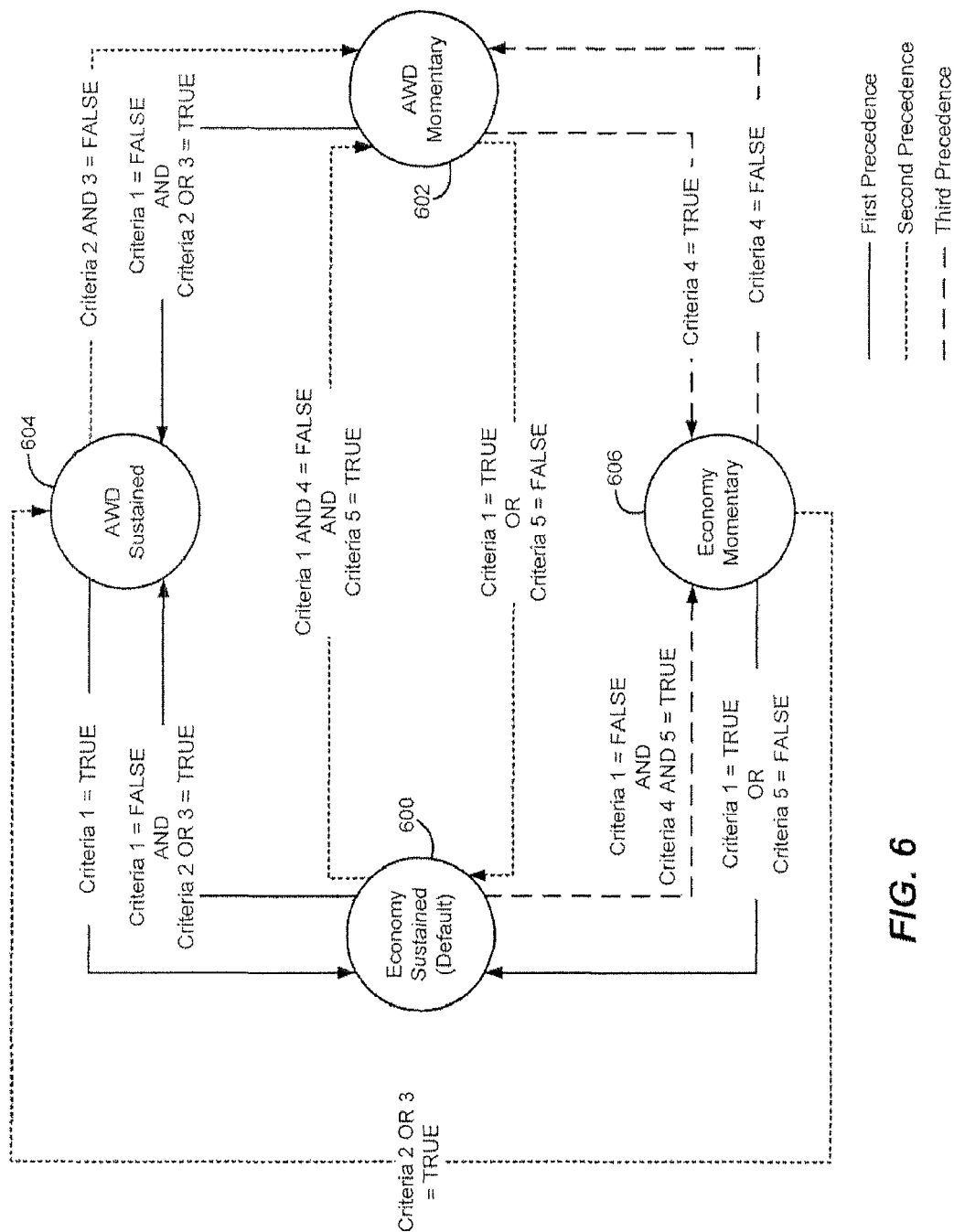
FIG. 6 is a state diagram of an axle disconnect strategy in accordance with embodiments of the present disclosure.
Figure 7A:
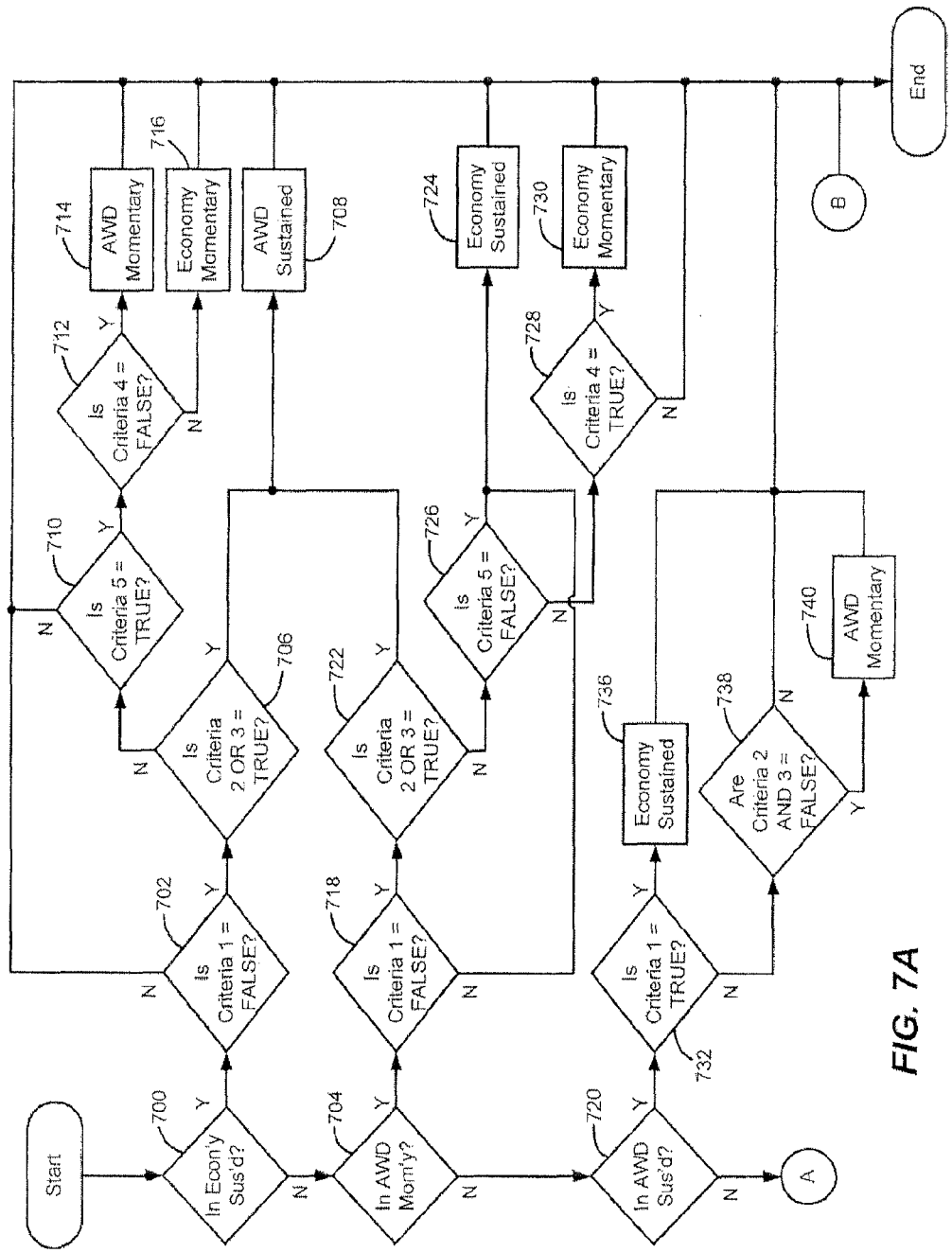
FIGS. 7A and 7B provide a flowchart illustrating exemplar steps for executing the axle disconnect strategy of FIG. 6.
Figure 7B:
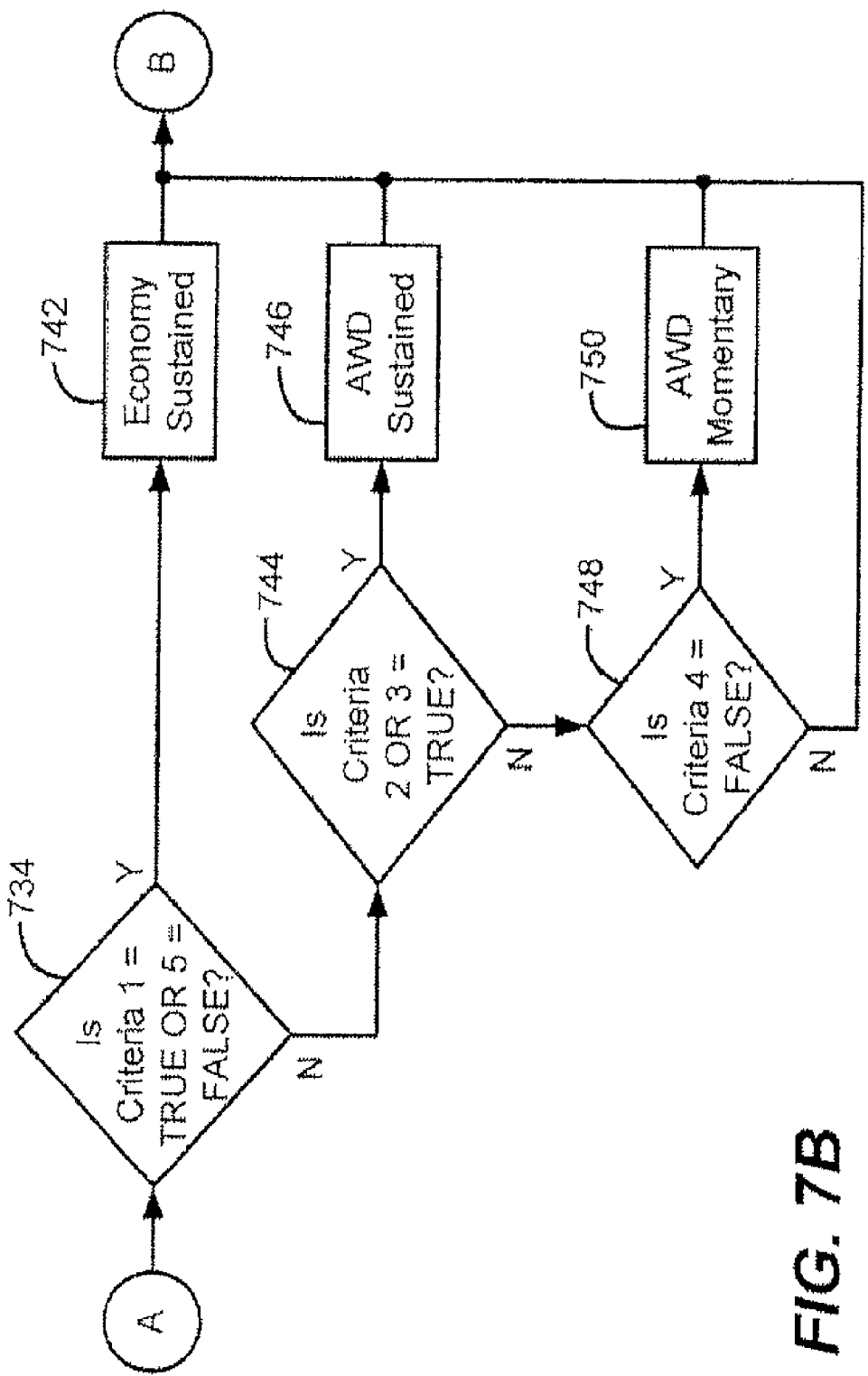

Referring now to FIGS. 6, 7A and 7B, another embodiment of the axle disconnect strategy will be described in detail. As illustrated in FIG. 6, operation of the vehicle can transition between an economy sustained mode 600, an economy momentary mode 602, an AWD sustained mode 604, and an AWD momentary mode 606. In the embodiment of FIG. 6, the economy sustained mode is provided as the default mode. When operating in the economy sustained mode, $FLAG_{AWD}$ is set equal to 0, the ADD is disengaged, or unlocked, and criteria 1-5 are monitored. More specifically, a first criteria set, a second criteria set and a third criteria set are monitored. The first criteria set includes criteria 1-3, the second criteria set includes criteria 1, 4 and 5, and the third criteria set also includes criteria 1, 4 and 5. The first criteria set takes precedence over the second criteria set, and the second criteria set takes precedence over the third criteria set. While operating in the economy sustained mode 600, if criteria 1 is false and either criteria 2 or criteria 3 is true, vehicle operation transitions to the AWD sustained mode 604. If neither criteria 2 nor criteria 3 is true, but both criteria 1 and criteria 4 are false, and criteria 5 is true, vehicle operation transitions to the economy momentary mode 602. If criteria 1 is false, neither criteria 2 nor criteria 3 is true, and both criteria 4 and criteria 5 are true, vehicle operation transitions to the AWD momentary mode 606.

While operating in the AWD sustained mode 604, $FLAG_{AWD}$ is set equal to 1, the ADD is engaged, or locked, and criteria 1 and criteria 2 are monitored. More specifically, a first criteria set and a second criteria set are monitored. The first criteria set includes criteria 1, and the second criteria set includes criteria 2. The first criteria set takes precedence over the second criteria set. When operating in the AWD sustained mode 604, if criteria 1 is true, vehicle operation transitions to the economy sustained mode 600. If criteria 1 is not true, and criteria 2 is false, vehicle operation transitions to the economy momentary mode 602.

While operating in the economy momentary mode 602, $FLAG_{AWD}$ is set equal to 0, the ADD is disengaged, or unlocked, and criteria 1-5 are monitored. More specifically, a first criteria set, a second criteria set and a third criteria set are monitored. The first criteria set includes criteria 1-3, the second criteria set includes criteria 1 and 5, and the third criteria set includes criteria 4. The first criteria set takes precedence over the second criteria set, and the second criteria set takes precedence over the third criteria set. When operating in the economy momentary mode 602, if criteria 1 is false and either criteria 2 or criteria 3 is true, vehicle operation transitions to the AWD sustained mode 604. If the first criteria set is not met, and criteria 1 is true, or criteria 5 is false, vehicle operation transitions to the economy sustained mode 600. If neither the first nor second criteria sets are met, and criteria 4 is true, vehicle operation transitions to the AWD momentary mode 606.

While operating in the AWD momentary mode 606, $FLAG_{AWD}$ is set equal to 1, the ADD is engaged, or locked, and criteria 1-4 are monitored. More specifically, a first criteria set, a second criteria set and a third criteria set are monitored. The first criteria set includes criteria 1, the second criteria set includes criteria 2 and 3, and the third criteria set includes criteria 4. The first criteria set takes precedence over the second criteria set, and the second criteria set takes precedence over the third criteria set. When operating in the AWD momentary mode 606, if criteria 1 is true, vehicle operation transitions to the economy sustained mode 600. If the first criteria set is not met, and either criteria 2 or criteria 3 is true, vehicle operation transitions to the AWD sustained mode 600. In neither the first criteria set, nor the second criteria set is met, and criteria 4 is false, vehicle operation transitions to the economy momentary mode 602.

The flowchart of FIGS. 7A and 7B illustrates exemplar steps that can be executed to implement the axle disconnect strategy of FIG. 6. In step 700, it is determined whether the vehicle is operating in the economy sustained mode. If the vehicle is operating in the economy sustained mode, the steps continue at step 702. If the vehicle is not operating in the economy sustained mode, the steps continue at step 704. In step 702, it is determined whether criteria 1 is false. If criteria 1 is not false, the steps loop to end. If criteria 1 is dales, the steps continue at step 706. In step 706, it is determined whether either criteria 2 or criteria 3 is true. If either criteria 2 or criteria 3 is true, the steps continue at step 708. If neither criteria 2 nor criteria 3 is true, the steps continue at step 710. In step 708, vehicle operation transitions to the AWD sustained mode, and the steps loop to end. In transitioning to the AWD sustained mode, $FLAG_{AWD}$ is set equal to 1, and the transition routine is executed.

In step 710, it is determined whether criteria 5 is true. If criteria 5 is true, the steps continue at step 712. If criteria 5 is not true, the steps loop to end. In step 712, it is determined whether criteria 4 is false. If criteria 4 is false, the steps continue at step 714. If criteria 4 is not false, the steps continue at step 716. In step 714, vehicle operation transitions to the economy momentary mode, and the steps loop to end. In transitioning to the economy momentary mode, $FLAG_{AWD}$ is set equal to 0, and the transition routine is executed. In step 716, vehicle operation transitions to the AWD momentary mode, and the steps loop to end. In transitioning to the AWD momentary mode, $FLAG_{AWD}$ is set equal to 1, and the transition routine is executed.

In step 704, it is determined whether the vehicle is operating in the economy momentary mode. If the vehicle is operating in the economy momentary mode, the steps continue at step 718. If the vehicle is not operating in the economy momentary mode, the steps continue at step 720. In step 718, it is determined whether criteria 1 is false. If criteria 1 is false, the steps continue at step 722. If criteria 1 is not false, the steps continue at step 724. In step 722, it is determined whether either criteria 2 or criteria 3 is true. If either criteria 2 or criteria 3 is true, the steps continue at step 708, described above. If neither criteria 2 nor criteria 3 is true, the steps continue at step 726. In step 726, it is determined whether criteria 5 is false. If criteria 5 is false, the steps continue at step 724. If criteria 5 is not false, the steps continue at step 728. In step 724, vehicle operation transitions to the economy sustained mode, and the steps loop to end. In transitioning to the economy sustained mode, $FLAG_{AWD}$ is set equal to 0, and the transition routine is executed.

In step 728, it is determined whether criteria 4 is true. If criteria 4 is true, the steps continue at step 730. If criteria 4 is not true, the steps loop to end. In step 730, vehicle operation transitions to the AWD momentary mode, and the steps loop to end. In transitioning to the AWD momentary mode, $FLAG_{AWD}$ is set equal to 1, and the transition routine is executed.

In step 720, it is determined whether the vehicle is operating in the AWD sustained mode. If the vehicle is operating in the AWD sustained mode, the steps continue at step 732. If the vehicle is not operating in the AWD sustained mode, the vehicle is operating in the AWD momentary mode, and the steps continue at step 734 of FIG. 7B. In step 732, it is determined whether criteria 1 is true. If criteria 1 is true, the steps continue at step 736. If criteria 1 is not true, the steps continue at step 738. In step 736, vehicle operation transitions to the economy sustained mode, and the steps loop to end. In transitioning to the economy sustained mode, $FLAG_{AWD}$ is set equal to 0, and the transition routine is executed. In step 738, it is determined whether criteria 2 is false. If criteria 2 is not false, the steps loop to end. If criteria 2 is false, the steps continue at step 740. In step 740, vehicle operation transitions to the economy momentary mode, and the steps loop to end. In transitioning to the economy momentary mode, $FLAG_{AWD}$ is set equal to 0, and the transition routine is executed.

In step 734, it is determined whether criteria 1 is true. If criteria 1 is true, the steps continue at step 742. If criteria 1 is not true, the steps continue at step 744. In step 742, vehicle operation transitions to the economy sustained mode, and the steps loop to end (see FIG. 7A). In transitioning to the economy sustained mode, $FLAG_{AWD}$ is set equal to 0, and the transition routine is executed. In step 744, it is determined whether either criteria 2 or criteria 3 is true. If either criteria 2 or criteria 3 is true, the steps continue at step 746. If neither criteria 2 nor criteria 3 is true, the steps continue at step 748. In step 746, vehicle operation transitions to the AWD sustained mode, and the steps loop to end (see FIG. 7A). In transitioning to the AWD sustained mode, $FLAG_{AWD}$ is set equal to 1, and the transition routine is executed. In step 748, it is determined whether criteria 4 is false. If criteria 4 is false, the steps continue at step 750. If criteria 4 is not false, the steps loop to end (see FIG. 7A). In step 750, vehicle operation transitions to the economy momentary mode, and the steps loop to end (see FIG. 7A). In transitioning to the economy momentary mode, $FLAG_{AWD}$ is set equal to 0, and the transition routine is executed.

Figure 8:
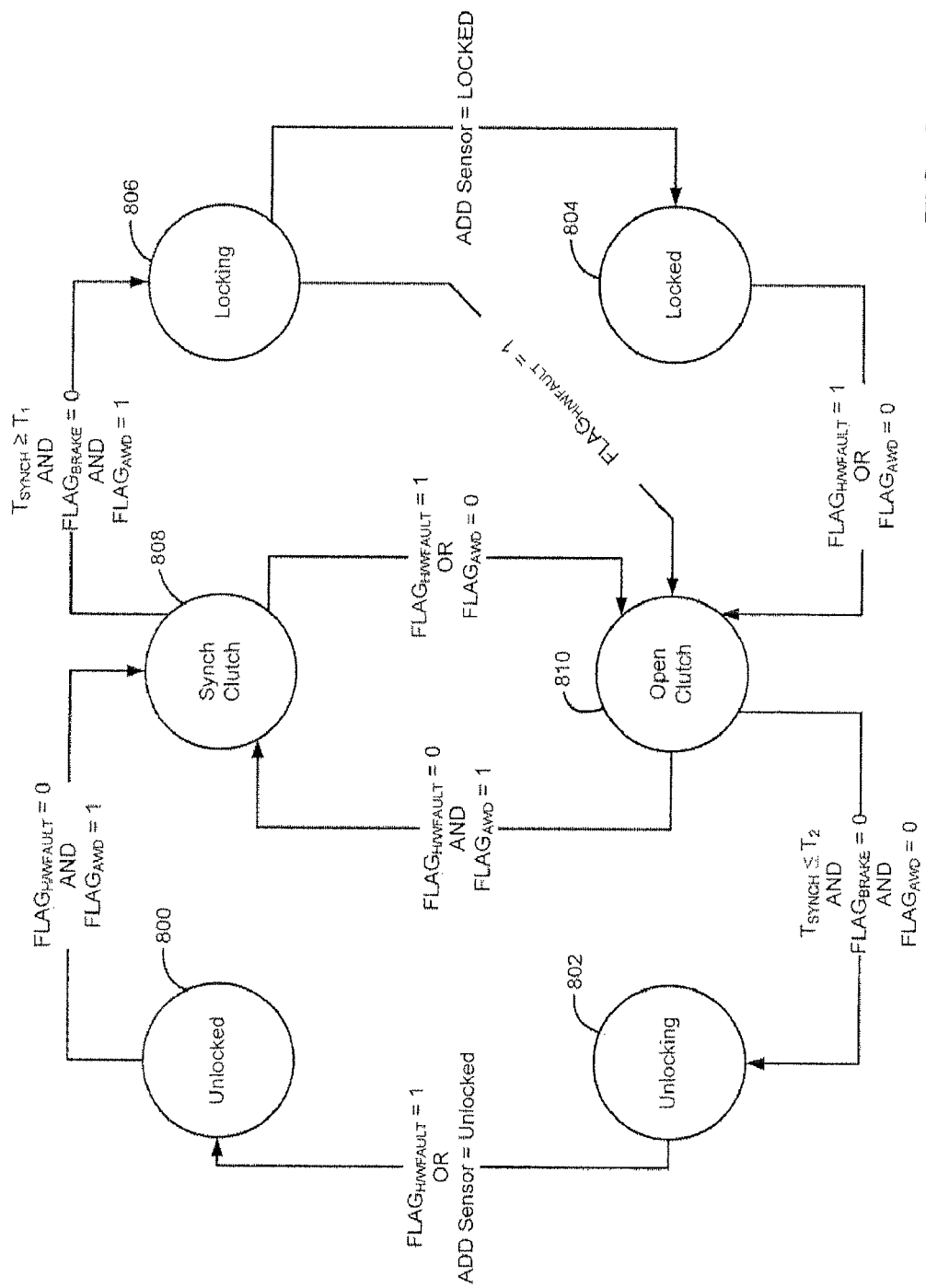
FIG. 8 is a state diagram of an exemplar axle disconnect device transition strategy in accordance with embodiments of the present disclosure.

Referring now to FIG. 8, an exemplar ADD transition is illustrated. The exemplar ADD transition includes an unlocked state 800, a transitional unlocking state 802, a locked state 804, and a transitional unlocking state 806. The exemplar ADD transition further includes a clutch synchronizing state 808, and a clutch open state 810 associated with the clutch 26 of the transfer case 16, as discussed in further detail below.

In an economy mode, the ADD is disengaged, or unlocked, and $FLAG_{AWD}$ is equal to 0. If a transition to an AWD mode is commanded, $FLAG_{AWD}$ is set equal to 1, and the vehicle systems are monitored for any hardware faults. More specifically, the control module continuously monitors operation of the various sensors, switches, and other components described herein. If one or more of these components is not operating correctly, a hardware fault flag ($FLAG_{H/WFAULT}$) is set equal to 1. Otherwise, $FLAG_{H/WFAULT}$ remains equal to 0. If there are no hardware faults (i.e., $FLAG_{H/WFAULT}$ is equal to 0), transition to the AWD mode continues with engagement of the clutch 26 of the transfer case 16 to provide torque to both outputs of the transfer case 16. More specifically, and prior to actuating the ADD to the locked position, the clutch 26 is regulated to provide torque to both the front and rear axle assemblies 18, 20.

In the clutch synchronizing state 808, $FLAG_{H/WFAULT}$ and $FLAG_{AWD}$ are monitored. If a hardware fault is detected (i.e., $FLAG_{H/WFAULT}$ is equal to 1), or $FLAG_{AWD}$ is set equal to 0 (i.e., transition to AWD mode aborted), the clutch 26 transitions to the clutch open state 810. If there are no hardware faults, $FLAG_{AWD}$ remains equal to 1, a synchronization torque ($T_{SYNCH}$) through the clutch has achieved or exceeded a threshold torque ($T_1$), and $FLAG_{STAB}$ is equal to 0 (i.e., no stability and/or traction events are detected), the ADD is actuated to the transitional locking state 806. In the transitional locking state 806, the ADD is partially actuated to the engaged, or locked position, and hardware faults are monitored. If no hardware faults are detected (i.e., $FLAG_{H/WFAULT}$ is equal to 0), the ADD continues to the fully engaged of locked state 804. If hardware faults are detected (i.e., $FLAG_{H/WFAULT}$ is equal to 1), the clutch open state 810 is entered, and transition to the AWD mode is aborted. In the locked state 804, an ADD sensor (not shown) indicates that the ADD is in the fully engaged, or locked position, and the vehicle is operating in an AWD mode.

In an AWD mode, the ADD is engaged, or locked, and $FLAG_{AWD}$ is equal to 1. If a transition to an economy mode is commanded, $FLAG_{AWD}$ is set equal to 0, and transition through to the unlocked state 800 is commenced. If, while in the locked state 804, a hardware fault is detected (i.e., $FLAG_{H/WFAULT}$ is equal to 1), transition to the unlocked state 800 is commanded. Transition to the economy mode continues with disengagement of the clutch 26 of the transfer case 16 to provide reduced torque to the outputs of the transfer case 16. More specifically, and prior to actuating the ADD to the unlocked position, the clutch 26 is regulated to reduce torque to both the front and rear axle assemblies 18, 20.

In the clutch open state 810, $FLAG_{H/WFAULT}$ and $FLAG_{AWD}$ are monitored. If a hardware fault is not detected (i.e., $FLAG_{H/WFAULT}$ is equal to 1), and $FLAG_{AWD}$ is set back to 1 (i.e., transition to economy mode aborted), the clutch 26 transitions to the clutch synchronizing state 808. If there are no stability events detected (i.e., $FLAG_{STAB}$ is set equal to 0), and $T_{SYNCH}$ is at or below a threshold torque ($T_2$), the ADD is actuated to the transitional unlocking state 802. In the transitional unlocking state 802, the ADD is partially actuated to the disengaged, or unlocked position, and hardware faults are monitored. If a hardware fault is detected (i.e., $FLAG_{H/WFAULT}$ is equal to 1), or the ADD sensor (not shown) indicates that the ADD is in the fully disengaged, or unlocked position, the ADD is deemed to be in the unlocked state 800.

A number of embodiments of the present disclosure have been described. Nevertheless, it will be understood that various modifications may be made without departing from the spirit and scope of the disclosure. Accordingly, other embodiments are within the scope of the following claims.

What is claimed is:

1. A method of regulating an axle disconnect device that is operable in an axle assembly of a vehicle drivetrain, comprising:
   monitoring a plurality of parameters;
   determining whether an occurrence of at least one of a traction event and a stability event is imminent, such that the at least one of the traction event and the stability event will occur if no pre-emptive action is taken, based on at least one of the parameters, the stability event being determined based on a first set parameters, and the traction event being determined based on a second set of parameters; and
   regulating, as a pre-emptive action, the axle disconnect device to an engaged position if the occurrence of the at least one of the traction event and the stability event is imminent.

2. The method of claim 1, further comprising:
   determining whether the vehicle drivetrain is operating in a neutral tow condition; and
   regulating the axle disconnect device to a disengaged position if the vehicle drivetrain is operating in the neutral tow condition.

3. The method of claim 1, further comprising:
determining whether the vehicle drivetrain is operating in at least one of a trailer tow condition, and an incline condition based on the parameters; and
regulating the axle disconnect device to the engaged position if the vehicle drivetrain is operating in at least one of the trailer tow condition, and the incline condition.

4. The method of claim 1, further comprising:
determining whether the vehicle drivetrain is operating in a highway condition based on the parameters; and
regulating the axle disconnect device to a disengaged position if the vehicle drivetrain is operating in the highway condition, and if the vehicle drivetrain is not operating in another condition that requires the axle disconnect device to be in the engaged position.

5. The method of claim 1, further comprising:
determining a driver type based on the parameters; and
regulating the axle disconnect device to the engaged position if the driver type is provided as an aggressive driver type.

6. The method of claim 1, further comprising:
monitoring a first set of criteria;
monitoring a second set of criteria;
regulating the axle disconnect device based on the first set of criteria, if the first set of criteria are met; and
regulating the axle disconnect device based on the second set of criteria, if the first set of criteria are not met, and the second set of criteria are met.

7. The method of claim 6, wherein the first set of criteria includes a first plurality of vehicle drivetrain operating conditions, and the second set of criteria includes a second plurality of vehicle drivetrain operating conditions.

8. The method of claim 7, wherein the first and second pluralities of vehicle drivetrain operating conditions include at least one vehicle drivetrain operating condition in common.

9. The method of claim 1, further comprising:
monitoring operation of at least one component of the vehicle drivetrain;
determining whether a hardware fault condition is present based on the operation of the at least one component; and
regulating the axle disconnect device to a disengaged position if the hardware fault condition is present.

10. The method of claim 1, further comprising regulating a clutch to provide drive torque to a differential, within which the axle disconnect device is located, prior to engaging the axle disconnect device.

11. The method of claim 1, further comprising regulating a clutch to reduce drive torque provided to a differential, within which the axle disconnect device is located, prior to disengaging the axle disconnect device.

12. A vehicle drivetrain, comprising:
a control module that has instructions stored therein which, when executed by the control module, induces operations comprising:
monitoring a plurality of parameters;
determining whether an occurrence of at least one of a traction event and a stability event is imminent, such that the at least one of the traction event and the stability event will occur if no pre-emptive action is taken, based on at least one of the parameters, the stability event being determined based on a first set parameters, and the traction event being determined based on a second set of parameters; and
regulating, as a pre-emptive action, an axle disconnect device to an engaged position if the occurrence of the at least one of the traction event and the stability event is imminent.

13. The vehicle drivetrain of claim 12, wherein the operations further comprise:
determining whether the vehicle drivetrain is operating in a neutral tow condition; and
regulating the axle disconnect device to a disengaged position if the vehicle drivetrain is operating in the neutral tow condition.

14. The vehicle drivetrain of claim 12, wherein the operations further comprise:
determining whether the vehicle drivetrain is operating in at least one of a trailer tow condition, and an incline condition based on the parameters; and
regulating the axle disconnect device to the engaged position if the vehicle drivetrain is operating in at least one of the trailer tow condition, and the incline condition.

15. The vehicle drivetrain of claim 12, wherein the operations further comprise:
determining whether the vehicle drivetrain is operating in a highway condition based on the parameters; and
regulating the axle disconnect device to a disengaged position if the vehicle drivetrain is operating in the highway condition, and if the vehicle drivetrain is not operating in another condition that requires the axle disconnect device to be in the engaged position.

16. The vehicle drivetrain of claim 12, wherein the operations further comprise:
determining a driver type based on the parameters; and
regulating the axle disconnect device to the engaged position if the driver type is provided as an aggressive driver type.

17. The vehicle drivetrain of claim 12, wherein the operations further comprise:
monitoring a first set of criteria;
monitoring a second set of criteria;
regulating the axle disconnect device based on the first set of criteria, if the first set of criteria are met; and
regulating the axle disconnect device based on the second set of criteria, if the first set of criteria are not met, and the second set of criteria are met.

18. The vehicle drivetrain of claim 17, wherein the first set of criteria includes a first plurality of vehicle drivetrain operating conditions, and the second set of criteria includes a second plurality of vehicle drivetrain operating conditions.

19. The vehicle drivetrain of claim 18, wherein the first and second pluralities of vehicle drivetrain operating conditions include at least one vehicle drivetrain operating condition in common.

20. The vehicle drivetrain of claim 12, wherein the operations further comprise:
monitoring operation of at least one component of the vehicle drivetrain;
determining whether a hardware fault condition is present based on the operation of the at least one component; and
regulating the axle disconnect device to a disengaged position if the hardware fault condition is present.

21. The vehicle drivetrain of claim 12, wherein the operations further comprise regulating a clutch to provide drive torque to a differential prior to engaging the axle disconnect device.

22. The vehicle drivetrain of claim 12, wherein the operations further comprise regulating a clutch to reduce drive torque provided to a differential, within which the axle disconnect device is located, prior to disengaging the axle disconnect device.

23. The vehicle drivetrain of claim 12, further comprising:
a first axle assembly having a differential with the axle disconnect device operably disposed therein;
a second axle assembly; and
a clutch that regulates drive torque distribution between the first axle assembly, and the second axle assembly.

* * * * *